United States Patent [19]

Behrens

[11] Patent Number: 5,040,434
[45] Date of Patent: Aug. 20, 1991

[54] IGNITION KEY LOCKING DEVICE FOR GEARSHIFT PARK INTERLOCK SYSTEM

[75] Inventor: William L. Behrens, Lake Orion, Mich.

[73] Assignee: Chrysler Corporation, Highland Park, Mich.

[21] Appl. No.: 448,483

[22] Filed: Dec. 11, 1989

[51] Int. Cl.⁵ .................. B60K 20/06; B60K 28/00
[52] U.S. Cl. .................. 74/850; 74/878; 70/248
[58] Field of Search ............. 70/247, 248, 251, 256; 74/850, 878, 875, 500.5, 529

[56] References Cited

U.S. PATENT DOCUMENTS

| 4,724,722 | 2/1988 | Beauch et al. | 74/850 |
| 4,821,605 | 4/1989 | Dzioba | 74/850 |
| 4,854,193 | 8/1989 | Newman et al. | 74/850 |
| 4,884,423 | 12/1989 | Fancher | 70/248 |
| 4,905,802 | 3/1990 | Gotoh | 70/247 X |
| 4,926,688 | 5/1990 | Murasaki | 74/878 X |
| 4,932,283 | 6/1990 | Ishigami et al. | 74/850 X |
| 4,932,493 | 6/1990 | Sakurai et al. | 74/850 X |
| 4,967,883 | 11/1990 | Kito et al. | 70/252 X |

FOREIGN PATENT DOCUMENTS

| 30783 | 6/1981 | European Pat. Off. | 70/247 |
| 103558 | 4/1989 | Japan | 70/248 |
| 106754 | 4/1989 | Japan | 70/248 |
| 498958 | 1/1939 | United Kingdom | 70/248 |
| 2160485 | 12/1985 | United Kingdom | 70/248 |

Primary Examiner—Allan D. Herrmann
Assistant Examiner—Khoi Q. Ta
Attorney, Agent, or Firm—Edward P. Barthel

[57] ABSTRACT

A vehicle park interlock system has a column mounted ignition pin locking slider receiving device adapted to couple with an ignition pin locking slider of the ignition system of the vehicle. The ignition pin locking slider receiving device is coupled with a gearshift selector assembly forming the system. The system prohibits the vehicle gearshift from being moved from a park position without the vehicle ignition mechanism being unlocked, e.g. in an off, on, or start position.

5 Claims, 7 Drawing Sheets

IGNITION KEY LOCKING DEVICE FOR GEARSHIFT PARK INTERLOCK SYSTEM

BACKGROUND AND SUMMARY OF THE INVENTION

The present invention relates to vehicle transmissions and, more particularly, to a receiving mechanism on the vehicle steering column coupled with the ignition system of the vehicle to associate with a vehicle interlock system for locking the transmission in a park position when the ignition system of the vehicle is locked.

In vehicles having automatic transmissions with gearshift lever assemblies mounted on the vehicle's floor, it is desirable to have a device which is associated with the ignition system of the vehicle so that when the ignition is locked, the gearshift lever is locked in a park position. Relevant art illustrating various types of transmission shifters with park lock devices are illustrated in the following U.S. Pat. No.: 4,724,722, issued Feb. 16, 1988 to Beauch et al; U.S. Pat. No. 4,712,397, issued Dec. 15, 1987 to Niskanen; U.S. Pat. No. 4,671,085, issued June 9, 1987 to Yamaguchi et al; U.S. Pat. No. 4,474,085, issued Oct. 2, 1984 to DeVogelaere et al; U.S. Pat. No. 4,304,112, issued Dec. 8, 1981 to Osborn; U.S. Pat. NO. 4,270,624, issued June 2, 1981 to Jessop; and U.S. Pat. NO. 4,235,123, issued Nov. 25, 1980 to Simancik et al. While the above described patents appear to perform satisfactorily, designers are always striving to improve the art.

Accordingly, it is an object of the present invention to provide the art with a new and improved gearshift park interlock system. A new and improved gearshift lever assembly is provided by the present invention. A receiving device mounted on the steering column to associate with the ignition system is also disclosed. The present invention provides the art with a relatively simple, inexpensive interlock mechanism. The gearshift lever assembly disclosed substantially eliminates lost motion. A fail safe system to indicate if the linkage is broken between the column mounted receiving device and the gearshift lever assembly is also provided by the present invention. Further, the present invention provides a gearshift lever assembly and a steering column receiving device which are readily adapted to be secure to the floor and column of the vehicle, respectively, and which are adjusted and adapted to operating conditions after positioning on the floor and column.

From the subsequent detailed description, taken in conjunction with the accompanying drawings and appended claims, other objects and advantages of the present invention will become apparent to those skilled in the art.

BRIEF DESCRIPTION OF THE DRAWINGS

FIG. 24 is a side elevation view of the pin locking slider receiving device of FIG. 12 with the plate removed and showing the ignition pin in locking relationship therewith.

DETAILED DESCRIPTION OF THE PREFERRED EMBODIMENT

Figure 1:
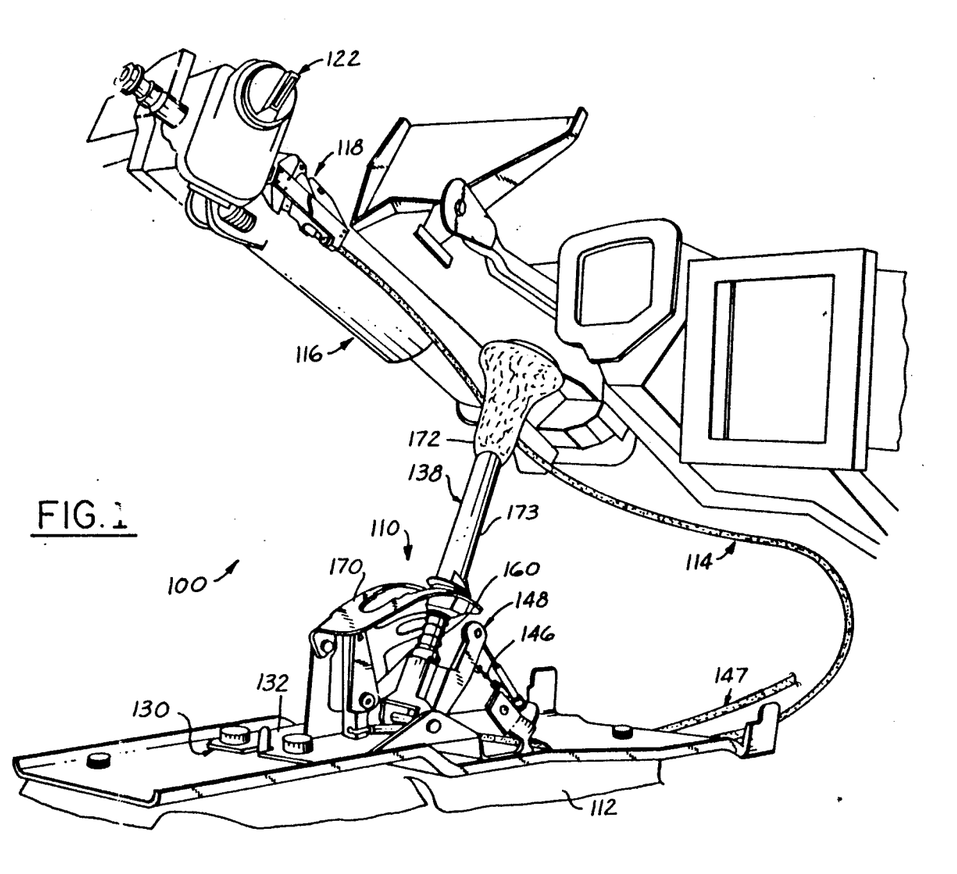
FIG. 1 is a perspective view illustrating an interlocking system in accordance with the present invention.
Figure 2:
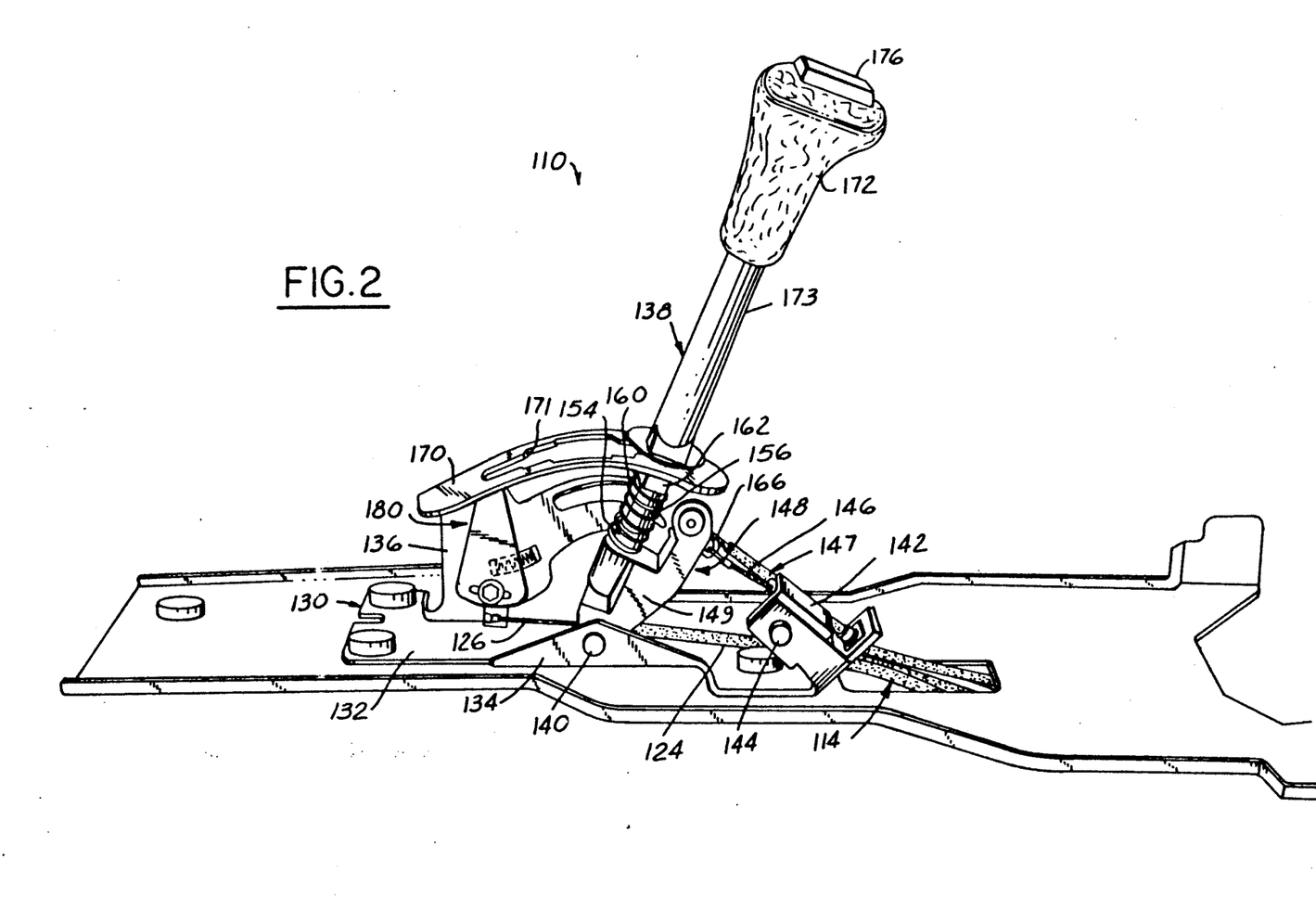
FIG. 2 is a perspective view of a gearshift assembly in accordance with the present invention.
Figures 3, 4:
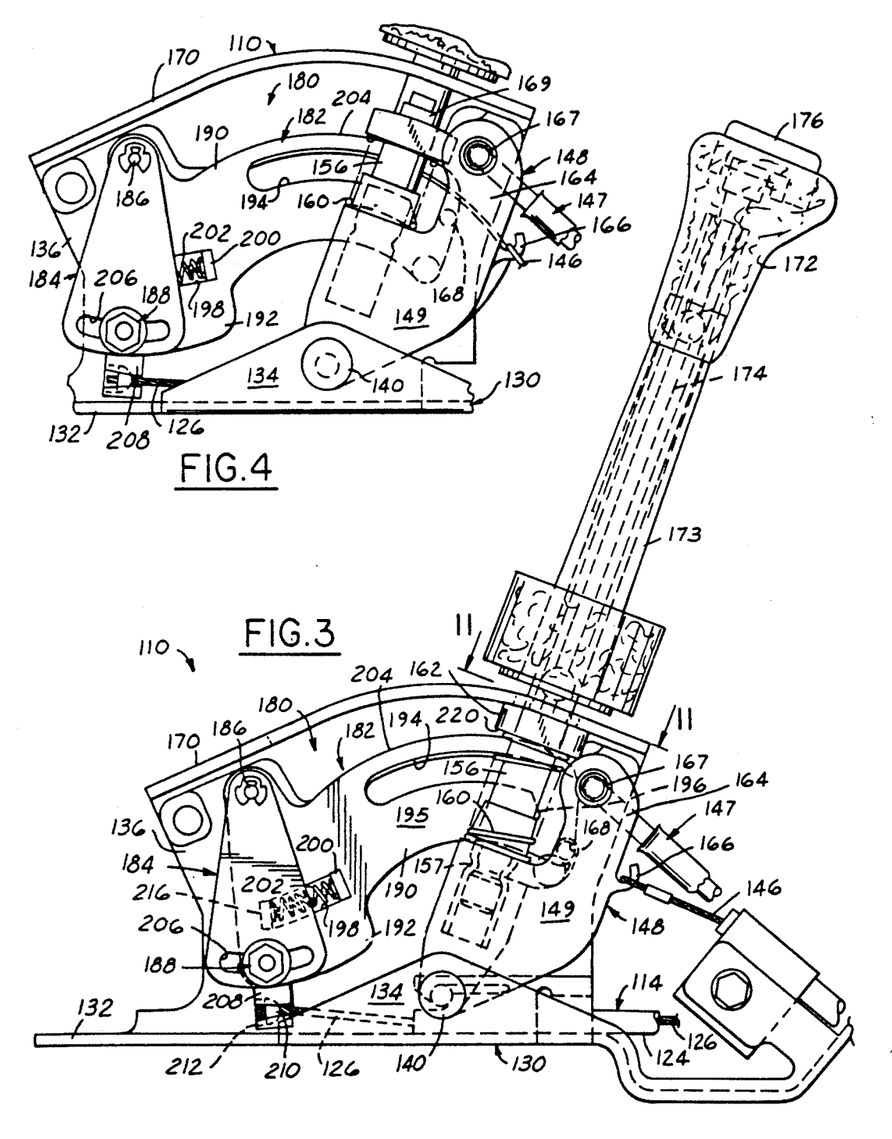
FIG. 3 illustrates a side elevation view of FIG. 2.
FIG. 4 is a side elevation view of a portion of the gearshift assembly of FIG. 3 with the assembly shown with the interlock released.

Referring to the figures, particularly FIGS. 1-3, a park interlock system in accordance with the present invention is illustrated in operative relationship to portions of a vehicle and is designated generally by the reference numeral 100. The park interlock system 100 includes a gearshift assembly 110 secured to the vehicle floor 112, an ignition pin receiving mechanism 118 and a linkage 114, such as a sheathed cable, which is connected to the gearshift assembly 110 and is routed along the vehicle floor, up the steering column 116 terminating at the mechanism 118. Mechanism 118 is designed to receive a elongated, rectangular sectioned, locking slider 120 associated with the vehicle ignition tumbler 122 to thereby lock the shift lever in a park position. The linkage 114 is generally of the type having an outer polymeric sheath 124 surrounding a braided metallic cable 126, however, several types of linkages may be utilized.

The gearshift assembly 110 includes a frame 130 having an offset base plate 132 with two parallel upstanding portions 134 and 136. The portions 134 and 136 each have holes to pivotally mount the shift lever assembly 138 by means of a transverse pin 140. The base plate 132 also includes an upstanding flange portion 142 with a threaded screw 144 or the like extending therefrom for attachment of cables 146 and 147 which, in turn, are associated with the PRNDL indicator on the console and the transmission, respectively.

Figure 9:
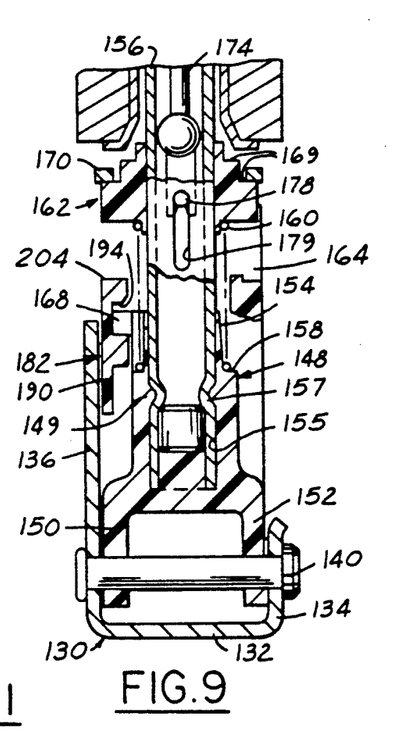
FIG. 9 is a cross-section view of the gearshift assembly shown in FIG. 6, the section being taken along line 9—9 thereof.

As best seen with reference to FIG. 9, the lever assembly 138 includes a pivot member 148 having a body 149 with a pair of ears 150 and 152 extending therefrom. The ears 150 and 152 have apertures therethrough to enable the pin 140 to pass through the ears 150 and 152 pivotally mounting the lever assembly 138 with the transverse pin 140. The pivot member body 149 also includes a neck 154 extending therefrom positioned in substantially parallel alignment with the ears 150 and 152 on the opposite side of the body 149. The neck 154 includes a bore 155 extending into the body 149 within which the lever member 156 is disposed and suitably secured thereto. Also, a shoulder 158 is formed on the pivot member body 149 at the base of the neck 154. A compression coil spring 160 encircles the neck 154 and is retained in compression between the shoulder 158 and a detent plunger 162. A finger 164 extends from the pivot body 149. The finger 164 includes a hook 166 which enables securement of cable 146 which is associated with the vehicle PRNDL indicator on the vehicle console. Also, the finger 164 includes an aperture 167 which receives and secures cable 147 which is associated with the vehicle transmission. The pivot member 148 is generally molded around lever 156 from a polymeric material whereby annular necked in portion 157 of lever 156 may serve to mechanically lock lever 156 in assembled relationship with pivot member body 149. The pivot member 148 also includes a pin 168 projecting from the body 149.

The plunger 162, the remainder of the lever assembly 38 and frame 130 are substantially identical to those described in U.S. Pat. No. 4,612,820, entitled "Automatic Transmission Shift Selector Mechanism", issued Sept. 23, 1986, assigned to the assignee of the present invention, the specification of which is hereby expressly incorporated by reference. However, some of the features disclosed in the above patent will be pointed out with respect to the plunger 162, lever assembly 138 and frame 130 to further clarify the operation of gearshift assembly 110 and the park interlock system of the present invention.

Figure 5:
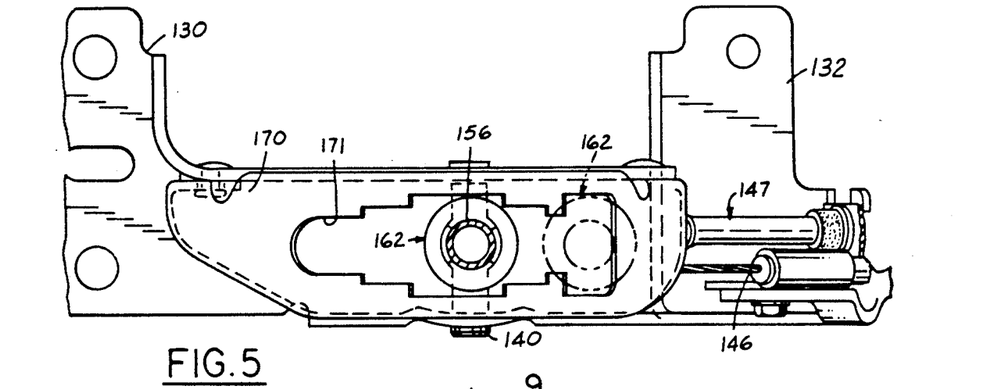
FIG. 5 is a section view of the gearshift assembly with the shift lever shown in a released position with respect to the assembly, the section being taken along line 5—5 of FIG. 6.

The plunger 162 includes a plurality of steps 169 selected ones of which are adapted to engage with the undersurface of the arcuate sector plate member 170. The sector plate assembly is like that described in the above referenced U.S. Pat. No. 4,612,820. The sector plate member 170 includes a detent slot 171 having defined openings of varying width for park, reverse and a plurality of drive positions, as can be seen in FIG. 5.

The lever member 156 includes an outer decorative elongated hollow cylindrical member 173 encasing the upper end portion thereof and to which a palm abutting knob 172 is secured at one end. Preferably, member 173 is formed from a plastic material. The member 156 is hollow and has an elongated push rod 174 therein which is axially moveable. The top of the push rod 174 is affixed to an operating member or button 176 which protrudes from a central cavity in the knob 172. The plunger 162 is releasably secured to the push rod 174 by means of a cross pin 178 which extends through an axially elongated slot 179 in lever member 156, as seen in FIG. 9. Thus, the compression spring 160 biases the plunger 162, plunger pin 178 and rod 174 in an axial direction towards the lever upper handle.

Figure 10:
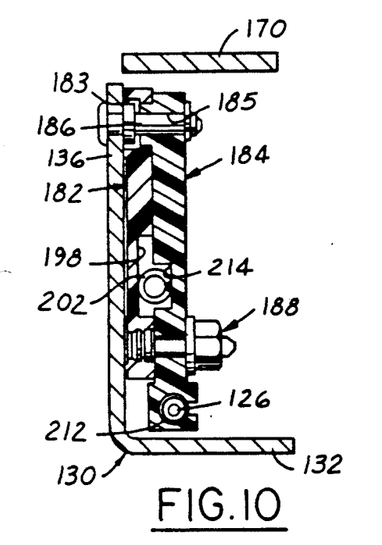
FIG. 10 is a fragmentary cross-section view of the gearshift assembly shown in FIG. 6, the section being taken along line 10—10 thereof.

As best seen with reference to FIGS. 3 and 10, a cam mechanism 180, pivotally mounted on portion 136 of frame 130, is coupled with the linkage 114 which, in turn, is associated with the pin receiving mechanism 118. The cam mechanism 180 includes a first cam member 182 and a second coupling member 184. The first and second members 182, 184 include apertures 183 and 185, respectively, to enable a pin 186 to pivotally secure members 182 and 184 to portion 136 of frame 130. Also, fastener assembly 188 adjustably secures the first and second members 182 and 184 to one another.

Figures 6, 7, 7A, 8:
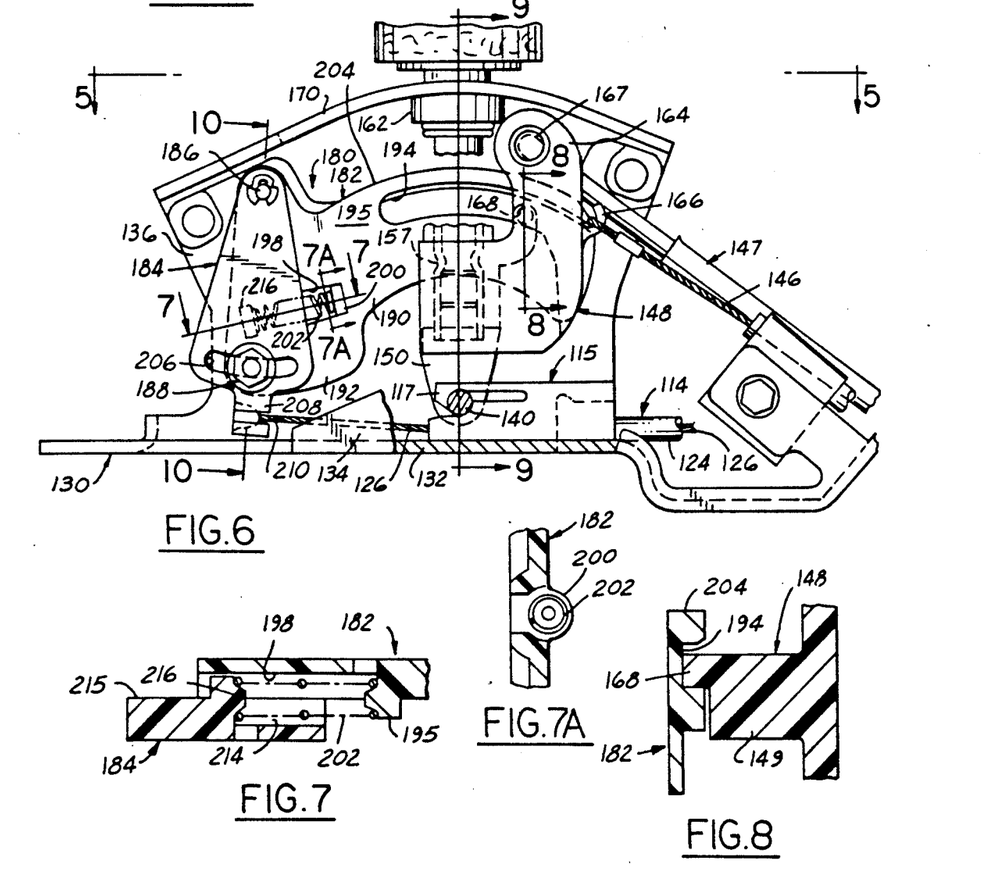
FIG. 6 a side elevation view of a portion of the gearshift assembly of FIG. 5 with portions thereof broken away.
FIG. 7 is a cross-section view of a portion of the gearshift assembly shown in FIG. 6, the section being taken along line 7—7 thereof.
FIG. 7A is a fragmentary vertical sectional view taken along the line 7A—7A of FIG. 6.
FIG. 8 is a cross-section view of a portion of the gearshift assembly shown in FIG. 6, the section being taken along line 8—8 thereof.

The first member 182 has an overall arrow shape with an arcuate shaft portion 190 and a truncated head 192. A surface 204 is provided on the upper edge of the arcuate shaft portion 190 against which the bottom surface 220 of plunger 162 is moveable to impart initial pivotal movement to the cam mechanism 180. The arcuate shaft portion 190 includes an arcuate groove 194 in major surface 195 to receive the pivot body pin 168. The groove 194 is engraved partially through the major surface 195 of shaft portion 190 and opens at the free depending end of the shaft portion 190. An inclined or beveled step 196 is formed in the raised major surface 195 of the shaft portion 190 at the free end of the groove 194 and serves as a cam surface to enable the pivot body pin 168 to effect further pivotal movement of cam mechanism 180 as pin 168 enters into the groove 194, as seen in FIGS. 3, 4 and 6. The sidewalls of groove 194 provide a continuing cam surface engageable by pin 168. The truncated head portion 192 includes an arcuate spring receiving groove 198 engraved in major surface 195 and being open at the tip of the truncated head portion 192, as seen in FIG. 7. Also, a combination stop and seat 200 is at the other end of the groove 198 extending from major surface 195 to provide an abutment surface and seat for spring 202.

The second member 184 generally has an overall triangular shape with curved vertices. An arcuate slot 206 is formed in the member 184 near the base of the triangular shape member. A tail 208 extends from the base. The tail 208 includes a notch 212 into which a slot 210 opens. Cable 126 of the linkage 114 is designed to extend through slot 210 and includes an enlarged end fitting which is received in notch 212. The member 184 also includes a groove 214 in major surface 215 to enable spring 202 to position therein. A projection 216 is at the terminus of the groove 214 to provide a seat for centering the spring 202, as can be seen in FIG. 7. Thus, spring 202 is sandwiched between grooves 198 and 214 provided in respective members 182 and 184 and extends between seats 200 and 216.

The linkage 114 includes a cap 115 having a bore therethrough for enabling passage of the cable 126. The cap 115 includes a tang member 117 secured to pin 140 to releasably retain the cap 115 in assembled relationship with the frame 130, as seen in FIG. 6.

Figures 12, 12A:
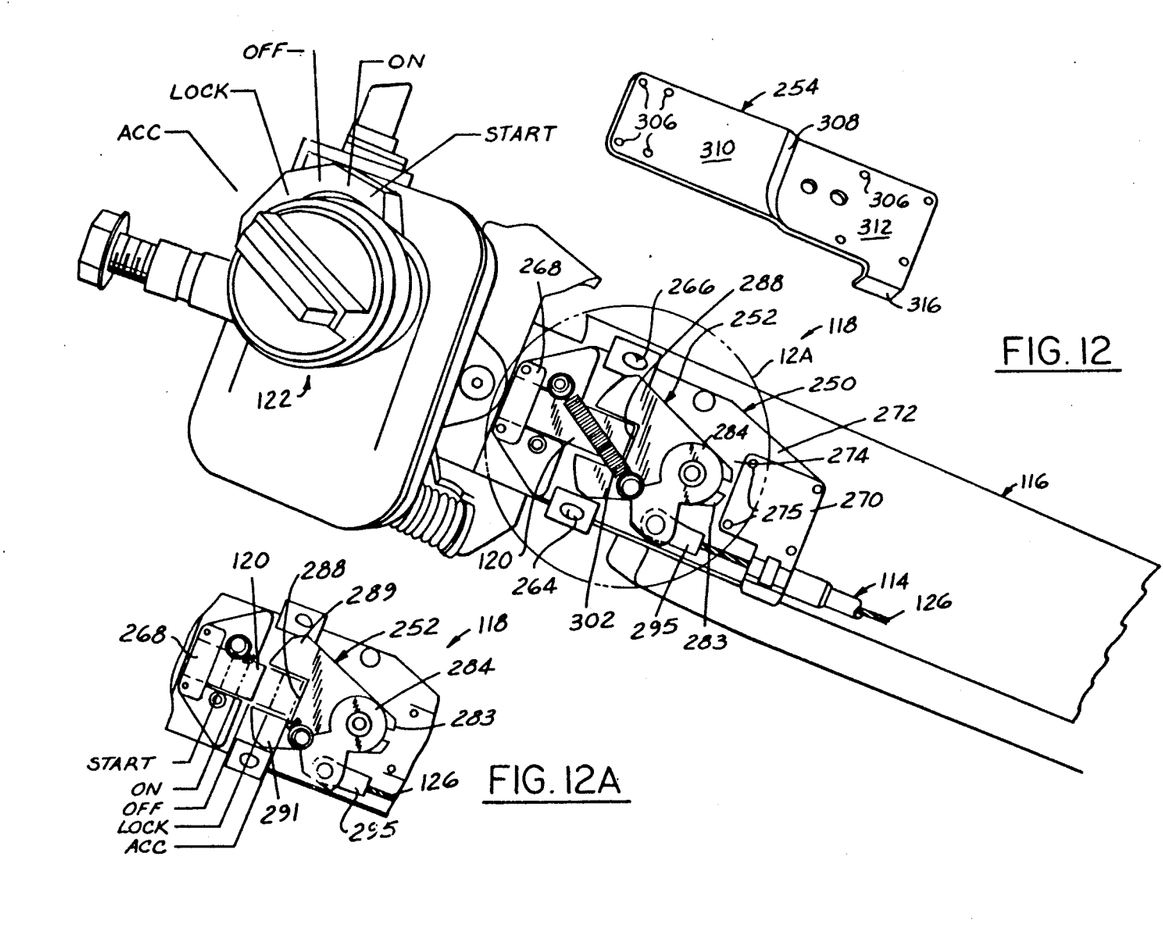
FIG. 12 is a partially exploded perspective view of an ignition locking slider receiving device in accordance with the present invention shown in operative relationship to a column mounted ignition lock.
FIG. 12A is a view of FIG. 12 within Circle 12A with the spring removed and the pin locking slider in a plurality of positions.

Turning to FIGS. 12-19, particularly FIG. 12, the receiving mechanism 118 is shown. The receiving mechanism 118 generally includes a housing 250, a moveable member 252 and a cover plate 254. Generally, the housing 250 and moveable member 252 are formed from a polymeric material and the cover plate 254 is formed from a metallic material. The cover plate 254 is designed to be secured to housing 250 in overlying relationship to the moveable member 252 so as to restrict direct access to the moveable member 252.

Figure 17:
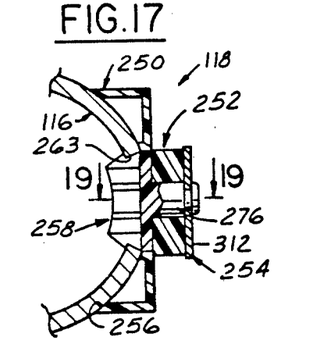
FIG. 17 is a cross-section view of the pin locking slider receiving device of FIG. 1 the section being taken along line 17—17 thereof.
Figure 18:
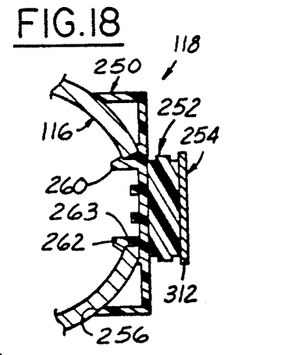
FIG. 18 is a cross-section view of the pin locking slider receiving device of FIG. 1 the section being taken along line 18—18 thereof.
Figure 19:
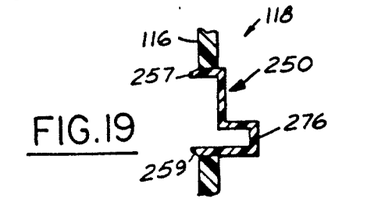
FIG. 19 is a fragmentary cross-section view of the pin locking slider receiving device of FIG. 14, the section being taken along line 19—19 of FIG. 12.

The housing 250 has an overall rectangular shape having an arcuate major surface 256. A retention mechanism 258 extends from the arcuate contour 256 adapted to facilitate positioning and securing of the housing to the steering column 116, (see FIG. 15). As best seen in FIGS. 17 and 18, the arcuate contour 256 abuts the steering column 116 and spaced flanges 257, 259 and spaced prongs 260 and 262 projecting outwardly from housing 250 are received within an aperture 263 provided on the steering column 116. Also, the housing may have apertures 264 and 266 for receiving screws or the like to aid in fastening the housing to the steering column 116.

Figure 13:
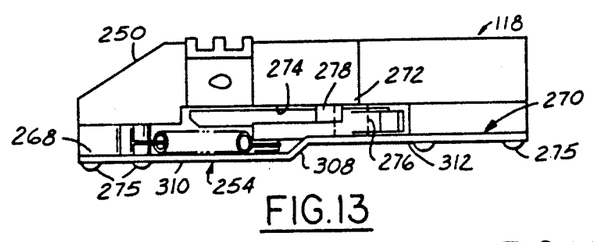
FIG. 13 is a is a top plan view of the assembled pin locking slider receiving device of FIG. 12.
Figure 14:
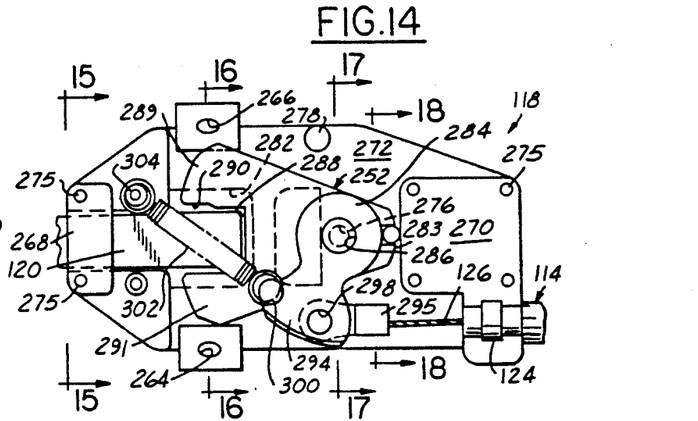
Figure 15:
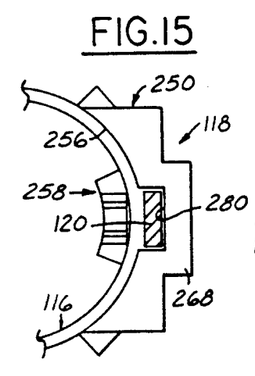
FIG. 15 is a cross-section view of the pin locking slider receiving device of FIG. 14, the section being taken along line 15—15 thereof.
Figure 16:
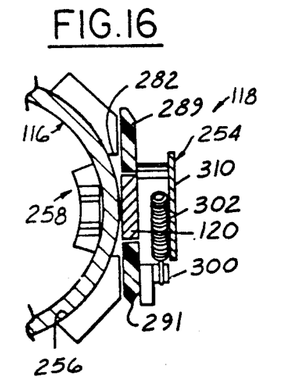
FIG. 16 is a cross-section view of the pin locking slider receiving device of FIG. 14, the section being taken along line 16—16 thereof.

As shown in FIGS. 13 and 14, the housing 250 includes a pair of raised portions 268 and 270 extending from the relatively planar major surface 272 of the housing 250. The raised portions 268 and 270 include a plurality of spaced posts 275 to secure the cover plate 254 to the housing 250. The posts 275 may be heat staked, compressed or the like to form heads securing the cover plate 254 to the housing 250. In between the raised portions 268 and 270 is a valley 274 having a substantially planar surface. The valley 274 provides a seat for the moveable member 252. A pivot pin 276 extends from the planar valley 274 providing a pivot for the moveable member 252. A second pin 278 extends from the valley 274 to limit movement of the moveable member 252. Also, an opening 280 is formed in the housing under the raised portion 268 to provide an entrance for the ignition locking slider 120. The opening 280 extends into the valley 274 providing an aperture 282 in the valley 274.

The moveable member 252 has an overall triangular shape with curved vertices. At the apex 283 of one of the vertices is an enlarged washer portion 284 having an aperture 286 for receiving the pivot pin 276. The washer portion 284 provides thickness to the moveable member 252 between the valley 274 and cover plate 254 to limit axial movement along pin 276 of the moveable member 252 when assembled, as seen in FIG. 13. The base of the triangular member 252 includes a cutout 288 for receiving the ignition locking slider 120 separating the other two vertices and forming legs 289 and 291. The cutout 288 includes a step 290 which provides an enlarged opening of the cutout 288. The enlarged opening including the step 290 enables the moveable member 252 to have additional clearance to accept the locking slider 120 in all ignition positions such as accessory and lock. The moveable member 252 includes a ledge portion 294 to provide securement for the end of the cable 126. The ledge portion 294 includes an aperture 298 to receive a pin from the end fitting 295 secured to cable 126. Generally, the ledge 294 is not as thick as member 252 proving a space between the ledge 294 and valley 274 to enable positioning of the end fitting 295 under the ledge 294, as illustrated in FIG. 14.

A post 300 extends outwardly from the moveable member 252 to enable securement of a coil spring 302. The other end of coil spring 302 is secured to a post 304 on the housing 250. The spring 302 provides a biasing force against the linkage 114. In the case where the cable 126 of the linkage 114 breaks or becomes disengaged after the locking slider 120 has been moved out of engagement with the moveable member cutout 288, the biasing member 302 will pivot the member 252 towards the limiting post 278 positioning leg 291 in alignment with opening 280 prohibiting the locking slider 120 from entering into the member 252. Thus, the vehicle operator would be alerted that a linkage problem in the vehicle park interlock system has been encountered.

The cover plate 254 has an overall rectangular shape with a plurality of apertures 306 to engage with posts 275. The cover plate also includes a bend 308 dividing the cover plate into two portions 310 and 312. Portions 310 and 312 are substantially parallel to one another, divided by the bend 308. The cover plate 254 provides an envelope between it and the housing valley 274 to enable positioning and pivotal movement of the member 252 therebetween. Also, the cover plate includes a tail 316 to sandwich the linkage sheath 124 between the housing 250 and the tail 316 to secure the linkage 114 to the housing 250, as seen in FIG. 14.

Figure 11:
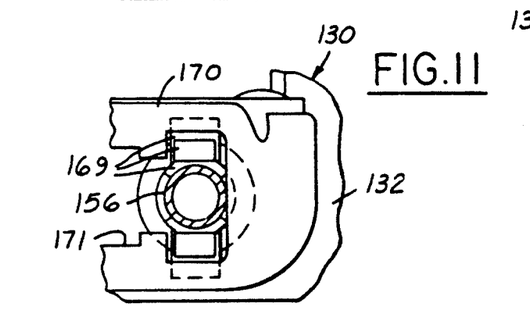
FIG. 11 is a fragmentary view of a portion of the gearshift assembly similar to FIG. 5 but illustrating the shift lever in the park position.

During installation, the fastener 188 is initially loose thereby enabling the member 184 to move with respect to member 182. Spring 202 will operate to bias member 184 in a direction away from member 182. The end of the cable 126 is positioned within the slots 212 and the receiving mechanism 118 is positioned on the steering column 116. The ignition locking slider 120 is moved into cutout 288 of the receiving mechanism and the lever assembly 138 is positioned in the park position of the sector plate 170, as seen in FIG. 11. Spring 202 takes up the slack in cable 126 enabling the fastener 188 to be tightened to affix the position of the member 184 with respect to member 182. With the members 182 and 184 secured in position with respect to one another and the fastener 188 tightened the linkage 114 is in a proper position to provide movement between the gearshift assembly 110 and receiving mechanism 118.

When the ignition system is in lock or accessory position, the locking slider 120 is engaged with the opening 280 and cutout 288, as seen in FIG. 12A. At this time, the member 252 is prohibited from moving which, in turn, prohibits the cam mechanism 180 from moving, which prohibits the button 176 from being pushed axially downward to release the lever assembly 138 from the park position. Thus, the transmission is locked when the vehicle ignition system is in a lock or an accessory position.

Once the ignition system is turned to off, to on or to start, the locking slider 120 is disengaged from the cutout 288 enabling member 252 to pivot, as seen in FIG. 12A. The button 176 is then pushed axially downward such that the push rod 174 moves the plunger 162 against spring 160 and cam surface 204 to enable pivotal movement of the lever assembly 138 in the sector plate 170. As the plunger 162 moves downwardly, the bottom surface 220 of the plunger contacts the curved cam surface 204 of the shaft portion 190 of member 182. As the shaft portion 190 is forced downward, as illustrated in FIGS. 4 and 6, the pin 168, extending from the body 149 of the pivotal member 148, is provided to be in alignment with the shaft portion groove 194, see FIG. 4. This movement causes leg 289 of member 252 to pivot in alignment with opening 280 blocking the opening. The lever assembly may then be pivoted into a reverse or a drive position. Also, the pivoting of leg 289 into alignment with opening 280 prohibits the vehicle ignition system from being locked as long as the vehicle is in a gear other than park. Thus, the driver must place the lever assembly into the park position and release the button 176 before the vehicle ignition can be locked to enable removal of the key.

As the lever assembly 138 is pivoted from the park position to a reverse or one of the drive positions, the pin 168 enters into the groove 194 maintaining the cam mechanism 180 in the down position, see FIGS. 6, 7 and 9. The movement of the members 182 and 184 affects the movement of the cable 126 within the linkage 114 which, in turn, affects the receiving mechanism 118, as explained herein. Also, as the lever mechanism 138 is pivoted, finger member 164 pivots which provides movement of the cables 146 and 147 which activates the vehicle's PRNDL indicator and transmission. Thus, as the button 176 is pushed and the lever mechanism 138 pivoted, the axial and pivotal movements are active affecting the function of the park interlock system 100, PRNDL indicator and transmission eliminating lost motion in the gearshift mechanism 110. When the lever assembly 138 is returned to the park position after being in a reverse or drive positions, the pin 168 disengages from groove 194, spring 160 biases against plunger 162 forcing the plunger step into the park detent slot in the sector plate 170 locking the lever in park once the locking slider 120 is engaged with receiving mechanism 118. Thus, the present invention provides the vehicle with a fail safe system requiring the vehicle to be in park for removal of the key from the ignition tumbler 122.

While the above detailed description discloses the preferred embodiment of the present invention, it will be understood that modifications, variations and alterations may be made to the present invention without deviating from the scope and fair meaning of the subjoined claims.

What is claimed is:

1. In a vehicle transmission shift selector park interlock system adapted to be used with a shift lever mechanism including a support means, a selector lever with a handle end and a pivot end, said selector lever pivot end mounted on said support means for pivotal movement between a plurality of drive positions and a park position, a selector plate fixed to said support means and having a longitudinal extending detent slot receiving said selector lever therethrough, a plunger supported on said selector lever for limited axial movement thereon, resilient means biasing said plunger axially toward said selector lever handle end, an operating button on said handle end operative when depressed to move said plunger axially toward said selector lever pivot end with said selector lever in its park position, an ignition key locking mechanism adapted to translate vehicle steering column key actuator slider means upon rotation of an ignition key to a plurality of positions including at least one locked position and at least one unlocked position, and said ignition key being removable from said ignition key locking mechanism only in said one locked position, an ignition key and shift selector interlock device comprising:

a housing;
means adapted for securing said housing to said steering column;
said housing including an opening adapted for receiving said slider means, said slider means in the form of an elongated rectangular shaped locking slider operated for reciprocal movement by said ignition key locking mechanism;
a plate member having an overall triangular shape defined by two equal sides and a base side, said base side including a central cutout opening forming first and second legs on either side of said cutout opening, said plate member pivotally connected to said housing adjacent its one vertice thereof opposite said base side, said cutout opening having a rectangular shape adapted for receiving said locking slider when said ignition key locking mechanism is in said one locked position, said locking slider being operable when received in said cutout opening to prevent movement of said pivotable plate member;
a cable linkage coupling said plate member to said shift lever mechanism, actuating means on said support means providing movement of said cable linkage in response to said operating button being pushed downwardly, said cable linkage movement adapted to rotate said plate member in a first rotational direction positioning said first leg in alignment with said housing opening thereby preventing said locking slider from entering said cutout opening, whereby with said ignition key locking mechanism in said one locked position said pivotable plate member prevents movement of said operating button when said locking slider is received in said cutout opening;
spring means being positioned with respect to said housing and said plate member operative for maintaining said cutout opening in alignment with said housing opening in response to a predetermined force applied by said cable linkage tending to rotate said member in a first rotational direction;
said spring means operative, in the event said cable linkage fails to exert a force on said plate member, to bias said plate member in a second rotational direction into contact with stop means positioning said second leg in alignment with said housing opening thereby preventing said locking slider from entering said cutout opening; and
whereby with said ignition key locking mechanism in said unlocked position upon said plate member having been rotated in the second rotational direction so as to position said second leg into alignment with said housing opening preventing said locking slider from entering said cutout opening and prohibiting said ignition key locking mechanism from being locked thereby preventing removal of said ignition key and alerting the vehicle operator as to a failure of said cable linkage.

2. The device according to claim 1 wherein said plate member cutout opening including first and second portions, said first portion being wider than said second portion enabling alignment of said locking slider;

3. The device according to claim 1 wherein said device further comprising a cover coupled with said housing and said cover prohibiting access to said moveable member.

4. The device according to claim 1 wherein said housing including an arcuate surface adapted to be positioned on said steering column.

5. The device according to claim 1 wherein said housing is molded from a polymeric material.

* * * * *